(12) United States Patent
Takahashi

(10) Patent No.: US 6,193,305 B1
(45) Date of Patent: Feb. 27, 2001

(54) WINDSHIELD SUPPORTING STRUCTURE

(75) Inventor: Akio Takahashi, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/359,387

(22) Filed: Jul. 23, 1999

(30) Foreign Application Priority Data

Jul. 24, 1998 (JP) .................................................. 10-209397

(51) Int. Cl.⁷ .................................................. B62D 25/08
(52) U.S. Cl. ........................ 296/192; 296/194; 296/96.21; 296/201
(58) Field of Search ................................. 296/192, 194, 296/96.21, 201

(56) References Cited

U.S. PATENT DOCUMENTS 4,976,491 * 12/1990 Hashimoto et al. .................. 296/192

FOREIGN PATENT DOCUMENTS 6-16156   1/1994  (JP) .

OTHER PUBLICATIONS

U.S. Patent Application. Ser.No. 09/309,263; filed: May 11, 1999; By: Akio Takahashi et al Title: Windshield Supporting Structure.

* cited by examiner

Primary Examiner—Joseph D. Pape
(74) Attorney, Agent, or Firm—Arent Fox Kintner Plotkin & Kahn, PLLC

(57) ABSTRACT

A windshield supporting structure, through which a windshield is supported on a dashboard includes, a first cantilever-like support constructed to extend substantially horizontally from a front edge of an upper surface of the dashboard toward a front of a vehicle body; and a second support extending from a distal end of the first support toward a lower edge of said windshield, the first support and the second support being constructed to form a substantially V-shaped cross-section. The second support includes a thin lower flange portion connecting with the distal end of the first support, a box portion having a hollow rectangular cross-section and being continued with the lower flange portion, and an upper flange portion supporting the windshield and being continued with the box portion.

8 Claims, 5 Drawing Sheets

WINDSHIELD SUPPORTING STRUCTURE

BACKGROUND OF THE INVENTION

1. Field of the Invention

The present invention relates to a windshield supporting structure for absorbing impact through deformation of a part of a vehicle body.

2. Description of the Related Art

In vehicle body structures, there is an impact absorbing structure in which an obstacle is protected from impact produced when the obstacle comes into collision with a vehicle body by absorbing the impact so produced through deformation of a part of the vehicle body.

As a typical example of this impact absorbing structure, Japanese Patent Unexamined Publication No. Hei. 6-16156 proposes a "Windshield Mounting Structure". The technology disclosed in this Publication will be described below, referring to FIG. 5.

FIG. 5 is a sectional view of a related windshield supporting structure, in which a pre-deformation state is indicated by a solid line, while a post-deformation state is indicated by a two-dot chain line.

This windshield structure is constructed such that a second member 102 is mounted to a cowl top panel 100, that an inserting portion 102a of the second member 102 is inserted into a first member 104, that the first member 104 is attached to the cowl top panel 100 with clips 106 . . . , and that a windshield panel 110 is attached to a connecting surface 102b of the second member 102 with an adhesive 108.

An inclined portion 100a of the cowl top panel 100 is attached to an upper portion 112a of a dashboard 112 so as to create a double construction. Therefore, should an obstacle such as a pedestrian come into collision with the windshield panel 110 to thereby produce an external force (force) F, which is applied to the windshield panel 110, the second member 102 is bent from a base portion 102c thereof, as shown by two-dot chain line.

However, since the distance L1 between a portion where the external force F is applied and the base portion 102c is short, even if the external force F is applied to the windshield panel 110, the second member 102 is only slightly deformed as indicated by the two-dot chain line. Due to this, should an obstacle come into collision with the windshield panel 110, there exists a risk of impact produced by the collision being not absorbed in a secure fashion.

FIG. 6 shows a windshield supporting structure adapted to absorb much impact that can be inflicted on an obstacle when it collides against the windshield.

FIG. 6 is a cross-sectional view of a typical conventional windshield supporting structure, in which a pre-deformation state is indicated by a solid line, while a post-deformation state is indicated by a two-dot line.

In this windshield supporting structure, a rear end 122a of a windshield support 122 is attached to a rear end 120a of an upper portion 120 of a dashboard. A rubber 124 is placed on a front end 122b of the windshield support 122 and a lower edge 126a of a windshield 126 is, in turn, placed on the rubber 124. The lower edge 126a is then attached to the front end 122b of the windshield support 122 with an adhesive 125.

Should an obstacle 130 collide against the windshield 126, an external force F is applied to the front end 122b of the windshield support 122. A distance L2 from the point where the external force F is applied to the rear end 122a as a fixed end is longer than the distance L1 shown in FIG. 5. This allows the windshield support 122 to bend relatively largely as shown by the two-dot chain line, thereby absorbing impact that can be inflicted on the obstacle 130 to some extent.

However, since only one member of the windshield support 122 is deformed when an external force is applied thereto, the magnitude of deformation is limited, and this may result in a risk of impact that is to be inflicted on the obstacle 130 not being securely absorbed.

SUMMARY OF THE INVENTION

To cope with the above problem, it is an object of the present invention to provide a technology for securely absorbing impact that is to be inflicted on an obstacle.

To solve the above object, there is provided a windshield supporting structure, through which a windshield is supported on a dashboard includes, a first cantilever-like support constructed to extend substantially horizontally from a front edge of an upper surface of the dashboard toward a front of a vehicle body; and a second support extending from a distal end of the first support toward a lower edge of said windshield, the first support and the second support being constructed to form a substantially V-shaped cross-section. The second support includes a thin lower flange portion connecting with the distal end of the first support, a box portion having a hollow rectangular cross-section and being continued with the lower flange portion, and an upper flange portion supporting the windshield and being continued with the box portion.

DETAILED DESCRIPTION OF THE PREFERRED EMBODIMENTS

Figure 1:
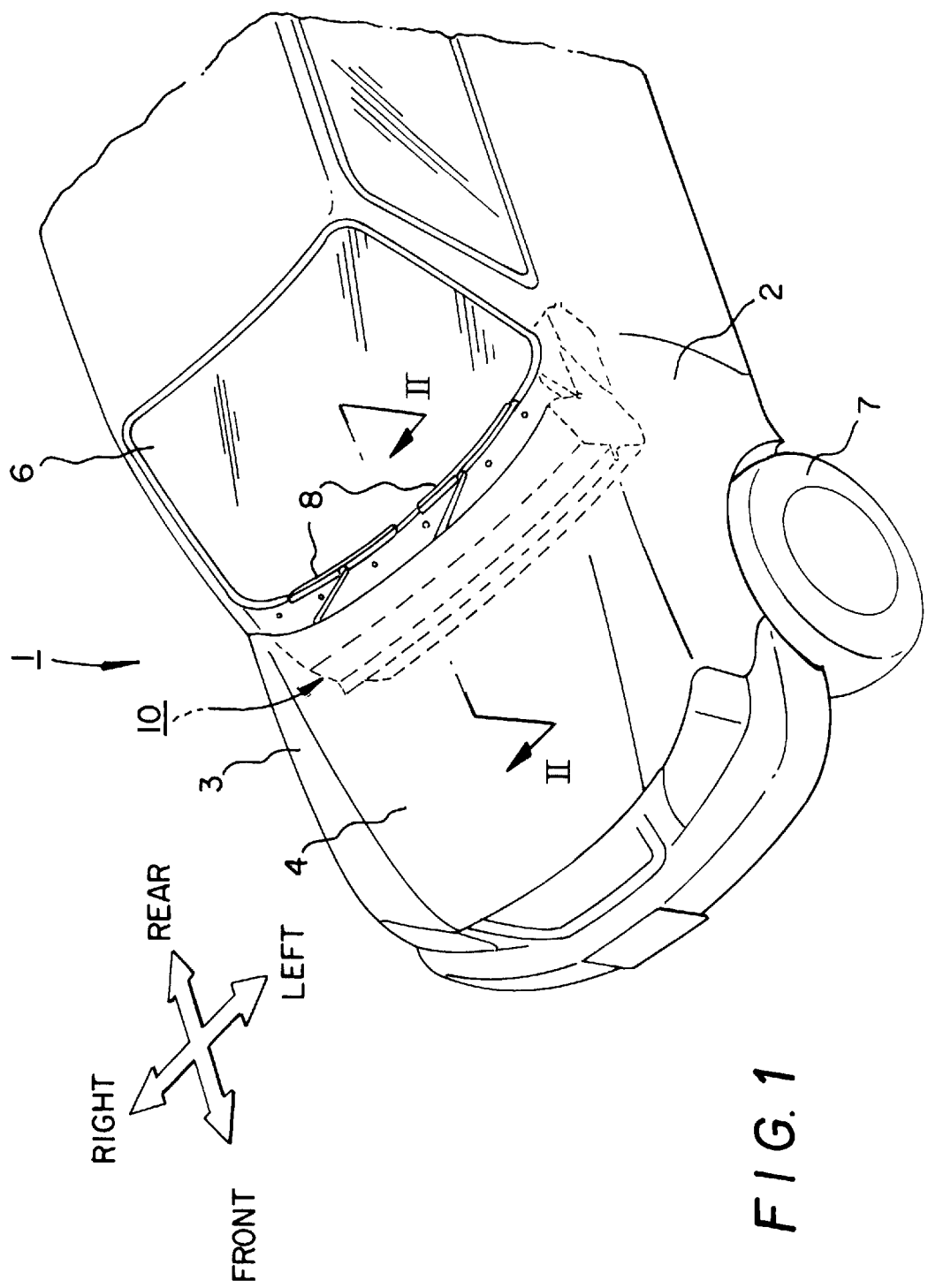
FIG. 1 is a perspective view of a windshield supporting structure according to the present invention attached to a vehicle body.

A mode of operation of the present invention will be described below with reference to the accompanying drawings. In FIG. 1, the drawings are to be seen in directions as indicated by arrows. In addition, in the description below, when described as "left", "right", "front" and "rear", they indicate a direction or a position as seen from the driver.

FIG. 1 is a perspective view of a vehicle body on which a windshield supporting structure according to the present invention is mounted.

The vehicle body 1 includes left and right front fenders 2, 3, a bonnet (hood) 4 disposed between the left and right front fenders 2, 3, and a windshield supporting structure 10 disposed rearward of the hood 4 for supporting a windshield (front window glass) 6. This windshield supporting structure 10 is a member made to extend in a vehicle width direction from the left fender 2 to the right fender 3 of the vehicle body 1. The windshield supporting structure 10 will be described in detail referring to the following figure.

Reference numeral 7 denotes a front wheel, and reference numerals 8, 8 denote windshield wipers.

Figure 2:
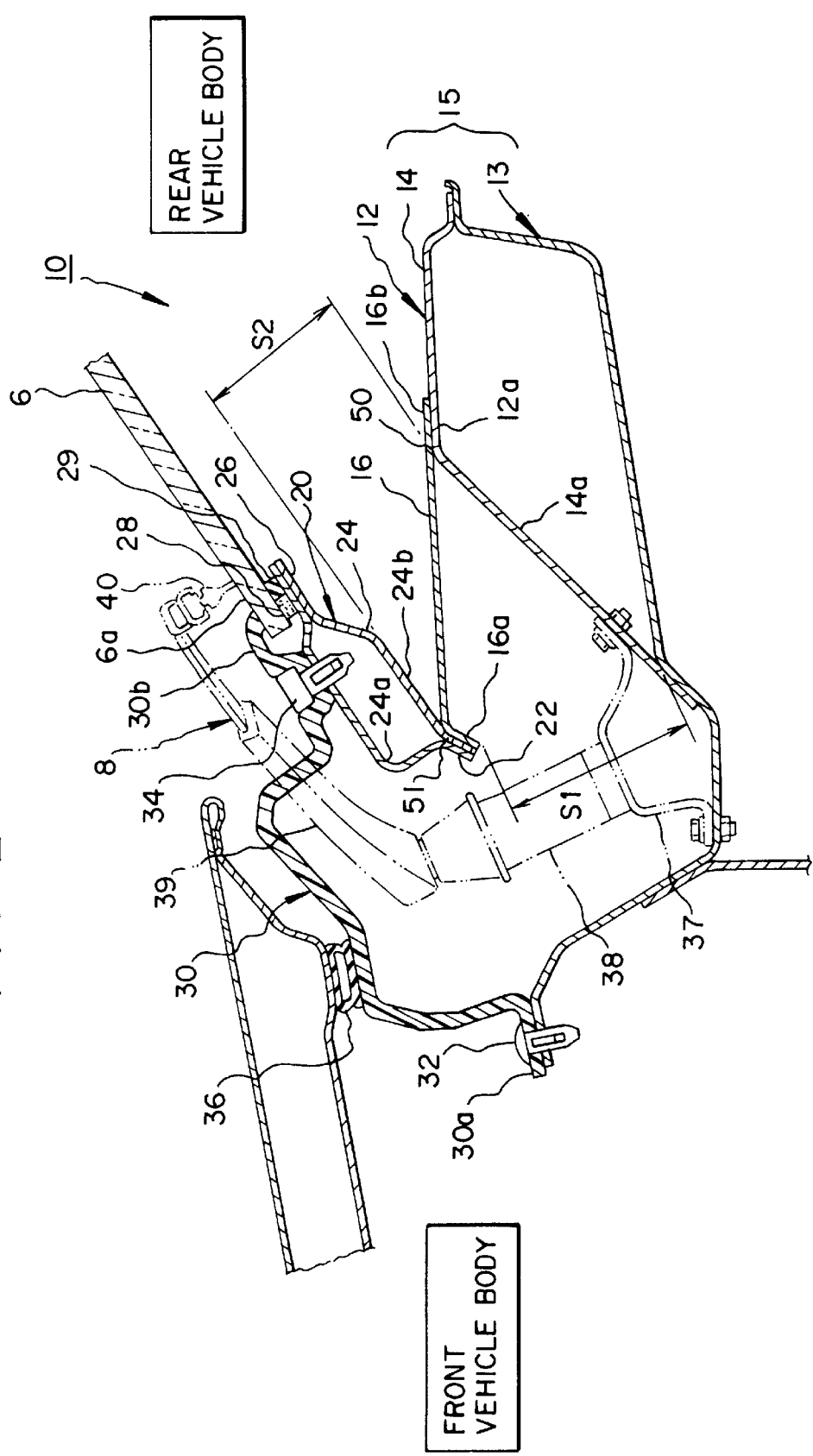
FIG. 2 is a sectional view taken along the line II—II of FIG. 1.

FIG. 2 is a sectional view taken along the plane of line II—II of FIG. 1.

The windshield supporting structure 10 is formed into a construction having a substantially V-shaped cross-section. This structure 10 includes a first cantilever-like support 16 constructed to extend substantially horizontally from a front edge 12a of an upper surface of a dashboard (instrument panel) 12 toward the front of a vehicle body and a second support 20 constructed to extend from a distal end 16a of the first support 16 toward a lower edge 6a of the front window glass (windshield) 6.

The upper portion of the dashboard 12 is formed into a box-like cross-sectioned portion 15 by a dashboard upper portion 13 and a reinforcement member 14 so as to enhance the rigidity sufficiently.

In the box-like cross-sectioned portion 15, a front half portion of the reinforcement member 14 is formed as an inclined portion 14a constructed to incline forward downwardly, and a rear end 16b of the first support 16 is attached to a top portion of the inclined portion 14a (i.e., the front edge 12a of the upper surface of the dashboard 12).

Since this construction can form a gap S1 between the box-like cross-sectioned portion 15 and the first support 16, the former does not hinder the latter from being deformed in a downward direction.

Since the first support 16 is constructed to extend substantially horizontally from the front edge 12a of the upper surface of the dashboard 12 toward the front of the vehicle body so as to form a cantilever-like configuration, it becomes a member that is easy to deform in vertical directions from a first joint end 50 of the first support 16 and the front edge 12a.

A second support 20 is constructed with members including a thin lower flange portion 22 connected to a front edge 16a of the first support 16, a box portion 24 having a hollow rectangular cross-section which is continuous with the lower flange portion 22 and an upper flange portion 26 for supporting the front window glass 6 which is continuous with the box portion 24. The second support 20 is attached to the first support 16 such that there is formed a gap S2 between the first support 16 and itself.

This construction allows the second support 20 to easily deform in the downward direction at a second joint end 51 of the thin lower flange portion 22 and the first support 16.

The box portion 24 is a member adapted to enhance the rigidity thereof by forming a hollow rectangular cross-sectioned portion by a box upper plate 24a and a box lower plate 24b.

The reason for enhancement in rigidity of the box portion 24 is that the front window glass 6 should be securely supported by the upper flange portion 26 continuous with the box portion 24.

The upper flange portion 26 is a member having a rubber 28 placed on an upper surface thereof and the lower edge 6a of the front window glass 6 is placed on the rubber 28 for attachment thereto with an adhesive 29.

A cowl top 30 is a synthetic resin member attached to the upper portion of the dashboard 12 at a front end 30a thereof with a clip 32 and to the box portion 24 at a rear end 30b thereof with a clip 34 for pressing against the lower edge 6a of the front window glass 6 at the rear end 30b thereof.

Reference numeral 36 denotes a seal, 37 denoting a bracket and 38 a wiper pivot holder, and this wiper pivot holder is a member for supporting a wiper shaft (not shown) of a front wiper 8. Reference numeral 39 denotes a wiper arm attached to a leading end of the wiper shaft, and reference numeral 40 denotes a wiper blade.

Next, operations of the aforesaid windshield supporting structure 10 will be described below.

Figure 3A:
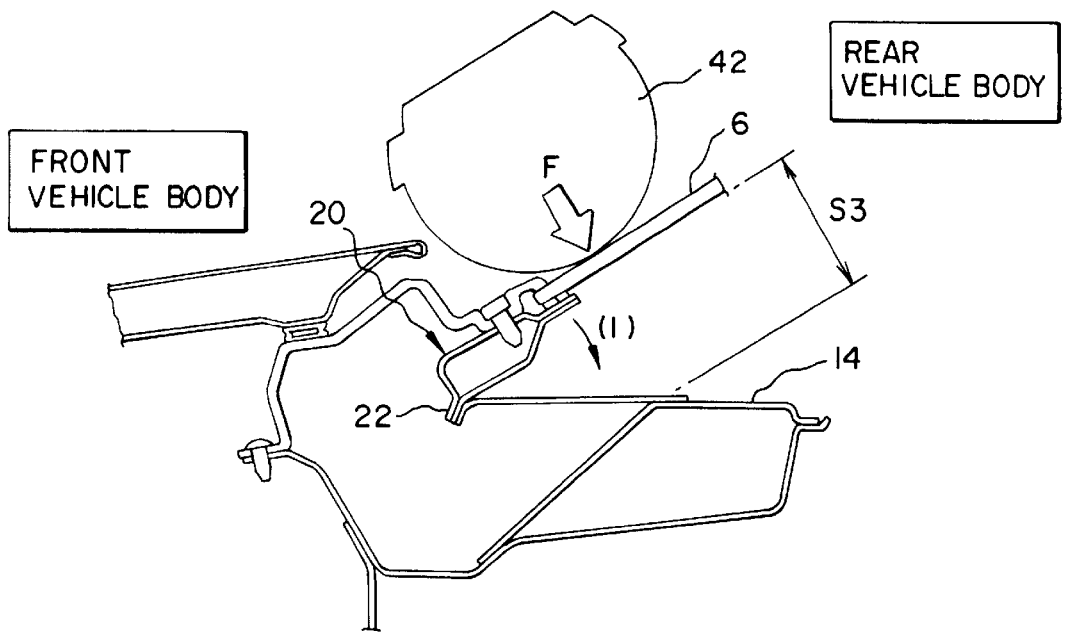
FIG. 3 is a first operation explanatory view explaining a first operation of the windshield supporting structure according to the present invention.
Figure 3B:
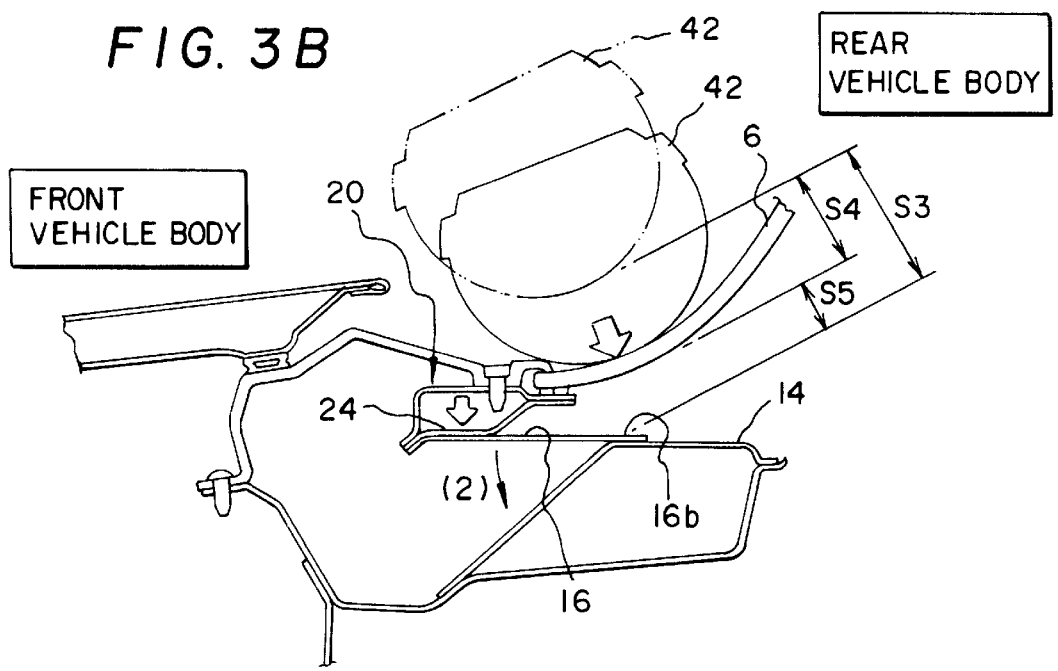

FIGS. 3A and 3B are explanatory views explaining a first operation of the windshield supporting structure according to the present invention.

In FIG. 3A, when an obstacle 42 collides against the front window glass 6, an external force F is applied to the front window glass 6 from the front of the vehicle body obliquely above (from the left upper portion to the right lower portion in the figure). The second support 20 bends with the thin lower flange portion 22 acting as a fulcrum as indicated by an arrow ①.

A gap is designated as S3 which is formed between the front window glass 6 and the first joint end 50 of the dashboard 12 (the reinforcement member 14) before the second support 20 is bent at the lower flange portion 22.

In FIG. 3B, the box portion 24 of the second support 20 abuts against the first support 16, and the second support 20 then becomes stationary. At this moment, the second support 20 deforms only by S4, this reducing the gap between the front glass window 6 and the dashboard 12 (the reinforcement member 14) to a gap designated as S5.

Then, after the second support 20 becomes stationary, the first support 16 deforms with the rear end 16b (the first joint end 50) acting as a fulcrum as indicated by an arrow ②.

Figure 4:
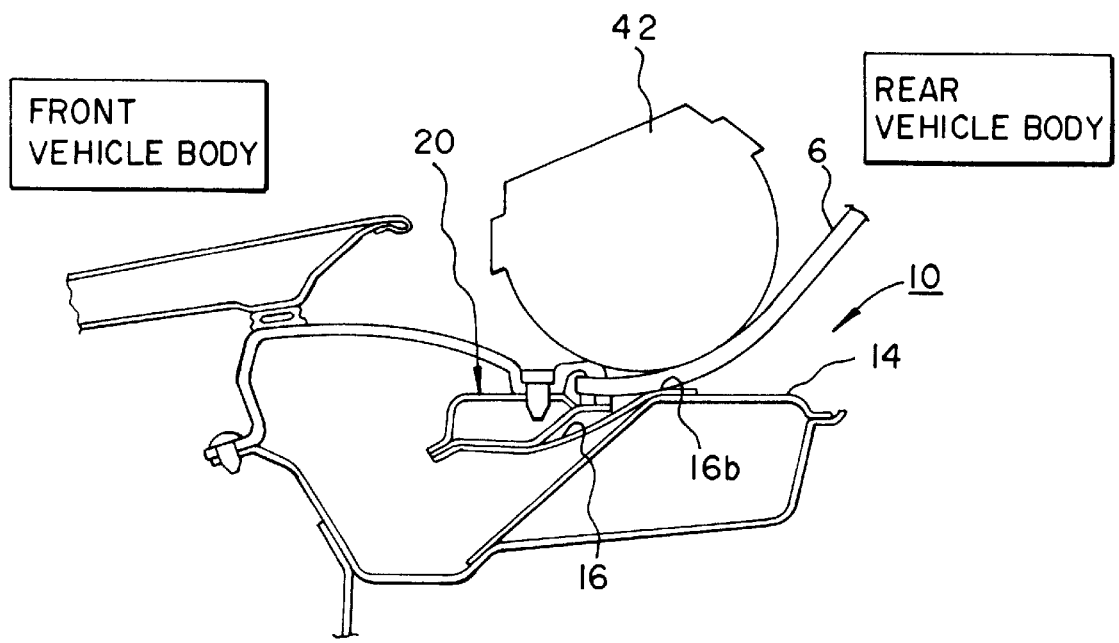
FIG. 4 is a second operation explanatory view explaining a second operation of the windshield supporting structure according to the present invention.
Figure 5:
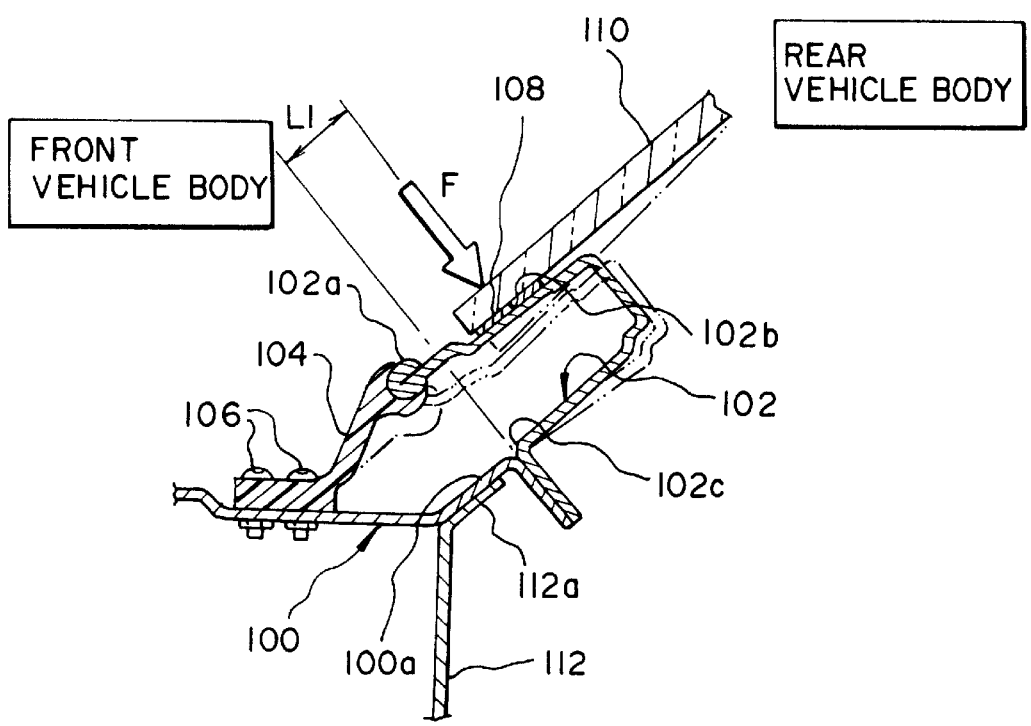
FIG. 5 is a sectional view of a typical conventional windshield supporting structure.
Figure 6:
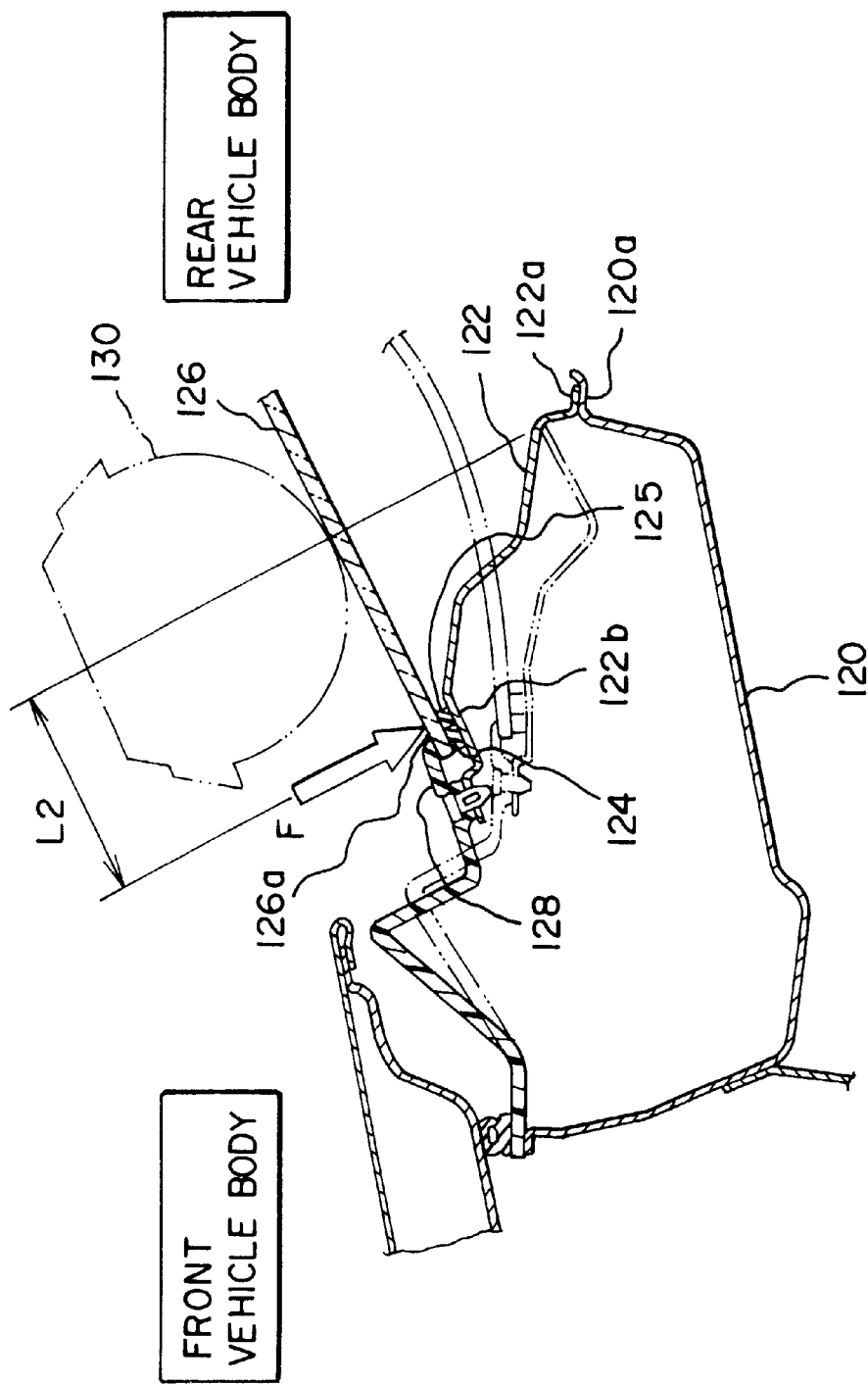
FIG. 6 is a sectional view of a typical conventional windshield supporting structure.

FIG. 4 is an explanatory view explaining a second operation of the windshield supporting structure according to the present invention.

When the first support 16 deforms by S5 (as shown in FIG. 3B), the front window glass 6 abuts against the rear end 16b of the first support 16, and the first support 16 then becomes stationary.

This results in the fact that the windshield supporting structure 10 deforms by the initial gap S3 (as shown in FIG. 3B) equal to the addition of the deformed amount S4 of the second support 20 (as shown in FIG. 3B) and the deformed amount S5 of the first support 16.

Thus, since a sufficient magnitude of deformation of the windshield supporting structure 10 can be secured, impact that is to be inflicted on the obstacle 42 can be securely absorbed.

In this embodiment, the windshield supporting structure 10 is applied to the front window side, but in addition thereto, the structure may be applied, for instance, to the rear window side.

In addition, the box portion 24 is formed into the hollow rectangular cross-section, but in addition thereto, the portion may be formed, for instance, into a triangular cross-section.

Furthermore, the front window glass may be replaced with other members such as the rear window glass or a member formed of a material other than glass.

Provided with the construction described heretofore, the present invention exhibits the following effectiveness.

Since the first support is constructed to extend substantially horizontally from the front edge of the upper surface of the dashboard so as to form a cantilever configuration, the first support easily deforms in the downward direction. In addition, since the thin lower flange portion of the second support is connected to the distal end of the first support, the second support easily bends at the lower flange portion (the second joint end).

With these constructions, since the first and second supports can easily be deformed by an external force applied to the front window glass or windshield, a sufficient magnitude of deformation of the windshield supporting structure can be secured. As a result of this, impact that is to be inflected on an obstacle can securely be absorbed.

Further, since the upper portion of the dashboard is formed into the box-like cross-sectioned portion, the rigidity of the upper portion of the dashboard can be enhanced.

In addition, the first support is constructed to extend from the front edge of the upper surface of the box-like cross-sectioned portion, a gap having a sufficient size can be secured between the box-like cross-sectioned portion and the first support. This eliminates a risk of the box-like cross-sectioned portion hindering the deformation of the first support.

This results in the improvement of rigidity of the vehicle body and allows the windshield supporting structure to be deformed sufficiently, thereby making it possible to securely absorb impact that is to be inflicted on an obstacle.

The present disclosure relates to the subject matter contained in Japanese patent application No. Hei. 10-209397 filed on Jul. 24, 1999 which is expressly incorporated herein by reference in its entirety.

While only certain embodiments of the invention have been specifically described herein, it will apparent that numerous modifications may be made thereto without departing from the spirit and scope of the invention.

What is claimed is:

1. A windshield supporting structure, including a dashboard through which a windshield is supported on said dashboard, comprising;
   a first cantilever-like support constructed to extend substantially horizontally from a front edge of an upper surface of said dashboard toward a front of a vehicle body; and
   a second support extending from a distal end of said first support toward a lower edge of said windshield, said first support and said second support being constructed to form a substantially V-shaped cross-section, said second support including:
   a thin lower flange portion connecting with said distal end of said first support;
   a box portion having a hollow rectangular cross-section and being continued with said lower flange portion; and
   an upper flange portion supporting said windshield and being continued with said box portion.

2. A windshield supporting structure according to claim 1, wherein said dashboard is constructed to have a box-like cross-sectioned portion at an upper portion thereof, and said first support is constructed so as to extend from said box-like cross-sectioned portion.

3. A windshield supporting structure comprising:
   a substantially horizontal first support constructed with one edge thereof and having the other edge pivotally deformable around the one edge; and
   a second support connected to the other edge of said first support,
   wherein said second support comprises:
   a lower flange portion attached to the other edge of said first support;
   a box portion having a hollow rectangular cross-section and extending from said lower flange portion in such a manner that a lower surface thereof is inclined by a predetermined angle with respect to said first support and is substantially parallel to a surface of a windshield; and
   an upper flange port ion extending from said box portion for supporting a windshield.

4. A windshield supporting structure according to claim 3, including a dashboard which has a box-like cross-sectioned portion at an upper portion thereof, said first support extends from said box-like cross-sectioned portion, and said box-like cross-sectioned portion includes an inclined surface contactable with said first support when said first support is deformed.

5. A windshield supporting structure according to claim 4, further comprising:
   a cowl top connected to a part of said dashboard and fastened to an upper surface of said box portion so as to interpose of said windshield between one end thereof and said upper flange.

6. A windshield supporting structure according to claim 3, wherein said upper flange portion and the lower surface of said box portion are arranged substantially parallel.

7. A windshield supporting structure according to claim 3, wherein said second support includes a first plate member constructing an upper surface of said box portion and a second plate member constituting the lower surface of said box portion, and said first and second members are joined at said lower flange portion and said upper flange portion.

8. A windshield supporting structure according to claim 4, wherein said first support has a length such that said upper flange portion is arranged forward of a joint end of said first support and said box-like cross sectioned portion when said windshield is completely deformed.

* * * * *